US012795696B2

(12) United States Patent
Xing et al.

(10) Patent No.: US 12,795,696 B2
(45) Date of Patent: Nov. 10, 2026

(54) CHANNEL ACCESS METHOD, DEVICE AND STORAGE MEDIUM

(71) Applicant: ZTE CORPORATION, Shenzhen (CN)

(72) Inventors: Weimin Xing, Shenzhen (CN); Youxiong Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 208 days.

(21) Appl. No.: 18/580,114

(22) PCT Filed: Jul. 21, 2022

(86) PCT No.: PCT/CN2022/106962
§ 371 (c)(1),
(2) Date: Jan. 17, 2024

(87) PCT Pub. No.: WO2023/001220
PCT Pub. Date: Jan. 26, 2023

(65) Prior Publication Data

US 2025/0089073 A1 Mar. 13, 2025

(30) Foreign Application Priority Data

Jul. 21, 2021 (CN) ......................... 202110825600.1

(51) Int. Cl.
*H04W 72/25* (2023.01)
*H04W 74/08* (2009.01)

(52) U.S. Cl.
CPC ....... *H04W 72/25* (2023.01); *H04W 74/0866* (2013.01)

(58) Field of Classification Search
CPC ............. H04W 74/0866; H04W 72/25; H04W 72/231; H04W 72/1273; H04W 72/1284;
(Continued)

(56) References Cited

U.S. PATENT DOCUMENTS 11,071,172 B2 * 7/2021 He .................... H04W 52/0251
2019/0306923 A1 10/2019 Xiong et al.
(Continued)

FOREIGN PATENT DOCUMENTS

CN 112153618 A 12/2020
CN 112655271 A 4/2021
(Continued)

OTHER PUBLICATIONS

Extended European Search Report in Application No. 22845384.1, dated Jul. 3, 2025, 9 pages.
(Continued)

*Primary Examiner* — Wei Zhao
(74) *Attorney, Agent, or Firm* — Morgan, Lewis & Bockius LLP

(57) ABSTRACT

Provided are a channel access method and apparatus, and a storage medium. The channel access method includes that: a transmission resource corresponding to a sidelink (SL) signal to be sent is determined; and in a case where a sent SL signal satisfying a preset condition is detected at a previous occasion of the transmission resource, channel access is performed by using a first channel access type, where a sensing duration of a channel access procedure corresponding to the first channel access type is a fixed value.

20 Claims, 3 Drawing Sheets

(58) Field of Classification Search
CPC . H04W 74/086; H04W 72/23; H04W 72/128; H04L 1/181; H04L 1/18
See application file for complete search history.

(56) References Cited

U.S. PATENT DOCUMENTS

| | | | | |
|---|---|---|---|---|
| 2021/0058905 | A1 | 2/2021 | Ganesan et al. | |
| 2022/0061095 | A1 * | 2/2022 | Xue | H04W 80/02 |
| 2023/0155773 | A1 * | 5/2023 | Zhang | H04W 72/232<br>370/329 |

FOREIGN PATENT DOCUMENTS

| | | | |
|---|---|---|---|
| WO | WO2021/016973 | A1 | 2/2021 |
| WO | WO2021/093893 | A1 | 5/2021 |

OTHER PUBLICATIONS

International Search Report in Application No. PCT/CN2022/106962, dated Oct. 19, 2022, 4 pages, including translation.

* cited by examiner

CHANNEL ACCESS METHOD, DEVICE AND STORAGE MEDIUM

CROSS REFERENCE TO RELATED APPLICATIONS

This is a national stage application filed under 37 U.S.C. 371 based on International Patent Application No. PCT/CN2022/106962, filed Jul. 21, 2022, which claims priority to Chinese Patent Application No. 202110825600.1 filed Jul. 21, 2021, the disclosures of which are incorporated herein by reference in their entireties.

TECHNICAL FIELD

The present application relates to the field of communications, for example, to a channel access method and device, and a storage medium.

BACKGROUND

The sidelink (SL) communication operates on a licensed frequency band or a dedicated frequency band, for example, the vehicle to anything (V2X) communication may operate on a frequency band dedicated to the Internet of Vehicles. With the development of the SL communication, the demand for SL transmission on the conventional unlicensed frequency band is becoming increasingly stronger. However, the coexistence between SL devices and devices of other systems of the unlicensed frequency band, such as the coexistence with the WiFi device, is not considered in the conventional SL communication mechanism.

SUMMARY

Embodiments of the present application provide a channel access method and device, and a storage medium, so as to implement the coexistence between SL devices and other devices of an unlicensed frequency band.

An embodiment of the present application provides a channel access method applied to a first communication node. The channel access method includes that a transmission resource corresponding to a sidelink (SL) signal to be sent is determined; and in a case where a sent SL signal satisfying a preset condition is detected at a previous occasion of the transmission resource, a channel access is performed by using a first channel access type, where a sensing duration of a channel access procedure corresponding to the first channel access type is a fixed value.

An embodiment of the present application provides a channel access method applied to a second communication node. The channel access method includes that at least one transmission resource or at least one transmission resource pool of a sidelink (SL) signal corresponding to each SL signal type is configured so that a first communication node transmits the SL signal by using the at least one transmission resource or a transmission resource in the at least one transmission resource pool.

An embodiment of the present application provides a channel access apparatus applied to a first communication node. The channel access apparatus includes a determination module and a first access module. The determination module is configured to determine a transmission resource corresponding to a SL signal to be sent. The first access module is configured to perform channel access by using a first channel access type in a case where a sent SL signal satisfying a preset condition is detected at a previous occasion of the transmission resource, where a sensing duration of a channel access procedure corresponding to the first channel access type is a fixed value.

An embodiment of the present application provides a channel access apparatus applied to a second communication node. The channel access apparatus includes a configurator. The configurator is configured to configure at least one transmission resource or at least one transmission resource pool of a SL signal corresponding to each SL signal type so that a first communication node transmits the SL signal by using the at least one transmission resource or a transmission resource in the at least one transmission resource pool.

An embodiment of the present application provides a channel access device. The channel access device includes a communication module, a memory, and one or more processors. The communication module is configured to perform a communication interaction between a first communication node and a second communication node. The memory is configured to store one or more programs. The one or more programs, when executed by the one or more processors, cause the one or more processors to implement the channel access method described in any one of the above-described embodiments.

An embodiment of the present application provides a storage medium storing a computer program. The computer program, when executed by a processor, implements the channel access method described in any one of the above-described embodiments.

DETAILED DESCRIPTION

Hereinafter, embodiments of the present application will be described below in conjunction with the accompanying drawings. The present application is described below in conjunction with the accompanying drawings in an embodiment. The instances are given solely for the purpose of illustration the present application.

In a case where a service needs to be sent between devices in an SL communication system or a direct connection communication system, service data between the devices is directly transmitted to a target device by a data source device without being forwarded by other network devices, that is, the devices communicate directly with each other. In the following description, the SL communication refers to all direct communications. In addition, according to an allocation method of a sidelink communication resource, the sidelink communication may be divided into two types of communication modes: in a first type of mode (simply referred to as mode one or mode 1), a resource for a user equipment (UE) to send a sidelink signal is scheduled by a base station; in a second type of mode (simply referred to as mode two or mode 2), the UE autonomously selects resources in a resource pool configured or preconfigured by the network according to a resource selection strategy, where the resource selection strategy includes a sensing mechanism, a partial sensing mechanism, and a random selection mechanism. The sidelink communication resource acquired in either the mode 1 or the mode 2 may be referred to as a sidelink resource grant (SL grant).

For a conventional SL resource allocation procedure, whether in a scheduling-based mode 1 or a sensing-based mode 2, the UE may, after obtaining a grant, transmit a signal on a grant resource. However, before performing a SL transmission in a conventional unlicensed frequency band, the UE needs to perform a listen before talk (LBT) procedure to avoid interference with the devices of other systems according to a related frequency band usage specification. Generally, if the channel resource is determined to be idle (LBT success) within an LBT duration, the UE may continue to send a signal, otherwise, the UE needs to abandon a signal transmission on the selected resource. For ease of the subsequent description, the meanings of sensing, channel, and configuration are explained.

Figure 1:
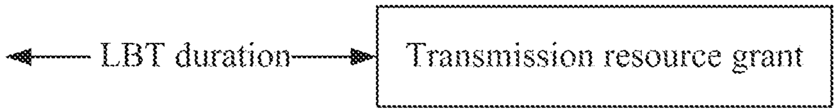
FIG. 1 is a schematic diagram of a relationship between an LBT duration and a transmission resource according to an embodiment of the present application.

Sensing: generally, a sensing procedure exists in both the LBT procedure and the SL resource scheduling procedure, but the LBT procedure and the SL resource scheduling procedure have different technologies. For the convenience of the subsequent description, a sensing procedure defined by the conventional SL is referred to as sensing, and a sensing procedure corresponding to the LBT is referred to as the LBT procedure. The general LBT procedure or channel access procedure occurs before a device (which may be a base station or a terminal) performs signal transmission, and the length in a span of time of the general LBT procedure or the channel access procedure may be referred to as the LBT duration (the duration may include multiple sensing slots). FIG. 1 is a schematic diagram of a relationship between an LBT duration and a transmission resource according to an embodiment of the present application. As shown in FIG. 1, when a channel is determined to be idle within the LBT duration, the device may send a signal.

Channel: when a channel access is described, the channel represents a physical layer communication medium, for example, a radio channel having a bandwidth of 20 MHz. When a channel/signal sent or received by the device is described, the channel represents a signal structure or format, for example, a physical sidelink control channel (PSCCH), which represents a channel/signal structure designed for control information; a physical sidelink shared channel (PSSCH), which represents a channel/signal structure designed for data information; or a physical sidelink feedback channel (PSFCH), which represents a channel/signal structure designed for feedback information. Multiple channels/signals are designed for the SL communication, the multiple channels/signals includes the PSCCH, PSSCH and PSFCH described above, may further include a signal/channel for synchronization such as a sidelink synchronization signal/physical broadcast channel block (S-SSB), and may further include other channels or reference signals (RSs) in the future, for example, the RS may include a link positioning reference signal (SL PRS), and subsequently, these SL channels or SL reference signals are uniformly referred to as SL signals.

Configuration: the configuration includes a pre-configuration, and the configuration refers to a process of notifying some configurations or some pieces of pre-configuration information to one device or a group of devices.

The new radio on unlicensed band (NR-U) defines multiple LBT procedures (which may also be referred to as channel access procedures) so as to be applicable to different scenarios.

A channel access procedure with a determined duration (type 2 channel access procedure): in this procedure, a duration of the LBT performed before signal transmission is a fixed value, for example, a duration of an LBT of Type 2A is equal to 25 us, and a duration of an LBT of Type 2B/2C is equal to 16 us, and for a Type 2C, the device does not perform LBT listening within the duration. The protocol may be referred and details will not repeated here.

Figure 2:
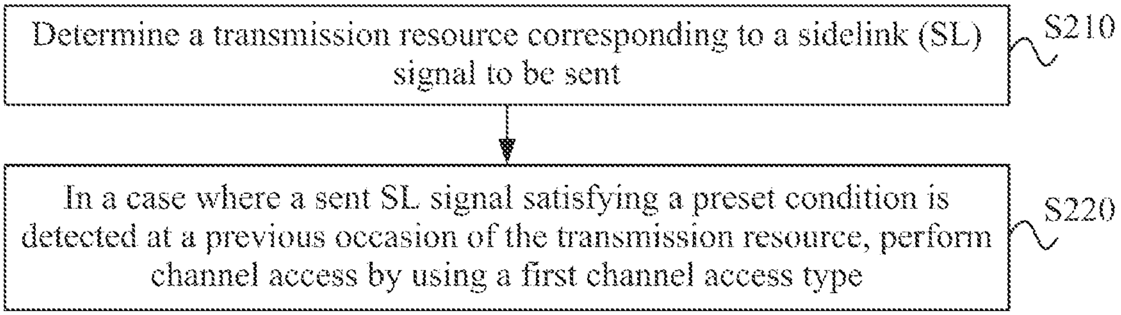
FIG. 2 is a flowchart of a channel access method according to an embodiment of the present application.

A channel access procedure (Type 1 channel access procedure) of a random duration: in this procedure, a duration of the LBT performed before signal transmission is not a fixed value but a random value. For example, the LBT duration may be equal to Td+N*Ts1, where Td is a deffer duration, Ts1 is a duration (generally 9 us) of one LBT sensing slot, and N is a random value. The Type 1 may also be divided into various channel access priority classes (CAPCs), where different CAPCs may correspond to different deffer durations, channel occupied time (COT), random number intervals and other parameters, and reference may be made to the protocol, which will not be repeated here. In an embodiment, FIG. 2 is a flowchart of a channel access method according to an embodiment of the present application. This embodiment may be performed by a channel access device, and the channel access device may be a first communication node. The first communication node may be a terminal side (such as, a user equipment). As shown in FIG. 2, this embodiment includes S210 to S220.

In S210, a transmission resource corresponding to a sidelink (SL) signal to be sent is determined.

The SL signal to be sent refers to an SL signal needing to be sent. In an embodiment, the transmission resource corresponding to the SL signal to be sent may be from the scheduling of a second communication node. Alternatively, the first communication node may also autonomously select a resource in a resource pool configured or preconfigured in the network according to the resource selection strategy, that is, the transmission resource corresponding to the SL to be sent may be implemented in the mode one, or in the mode two. The resource selection strategy may include a sensing mechanism, a partial sensing mechanism, or a random selection mechanism. Exemplarily, the second communication node refers to a base station side or a network side.

In S220, in a case where a sent SL signal satisfying a preset condition is detected at a previous occasion of the transmission resource, channel access is performed by using a first channel access type.

The sensing duration of the channel access procedure corresponding to the first channel access type is a fixed value. In an embodiment, the first channel access type corresponds to the channel access procedure (i.e., type 2 channel access procedure) of a determined duration in the above-described embodiments. The sent SL signal refers to an SL signal whose transmission has been completed. In an embodiment, when the sent SL signal satisfying the preset condition is detected at the previous occasion of the transmission resource corresponding to the SL signal to be sent, the channel access is performed by using the channel access procedure corresponding to the first channel access type. In an embodiment, a device corresponding to the SL signal to be sent and a device corresponding to the sent LS signal belong to a same type of device, that is, both belong to the SL device. Detecting the sent SL signal satisfying the preset condition at the previous occasion of the transmission resource corresponding to the SL signal to be sent means detecting that a similar device successfully competes for the channel resource (that is, the transmission resource) at the previous occasion of the transmission resource corresponding to the SL signal to be sent.

In an embodiment, in a case where sent SL signals of the same type of devices are detected at the previous occasion of the transmission resource corresponding to the SL signal to be sent, the SL signal to be sent directly performs a channel access by using a sensing duration of a fixed value, thereby achieving a channel access effect of the SL device in the unlicensed frequency band so as to achieve coexistence with other devices.

In an embodiment, the channel access method applied to the first communication node further includes that: in a case where the sent SL signal satisfying the preset condition is not detected at the previous occasion of the transmission resource, channel access is performed by using a second channel access type, where a sensing duration of a channel access procedure corresponding to the second channel access type is a random value or a fixed value, that is, the second channel access type corresponds to the channel access procedure (i.e., Type 2 channel access procedure) for a determined duration in the above-described embodiments, or a channel access procedure (Type 1 channel access procedure) for a random duration.

In an embodiment, in a case where the sent SL signal satisfying the preset condition is not detected at the previous occasion of the transmission resource corresponding to the SL to be sent, the channel access is performed by using the channel access procedure corresponding to the second channel access type. In the channel access procedure, an LBT procedure is performed before the transmission resource corresponding to the SL signal to be sent, and the LBT procedure corresponds to a random or determined LBT duration configured by one network. In an embodiment, the SL signal is detected at the previous occasion of the transmission resources corresponding to the SL signal to be sent, and the channel access type is determined according to the detection result, that is, it is determined whether the channel access procedure corresponding to the first channel access type or the channel access procedure corresponding to the second channel access type is used to perform channel access and the sending of the SL signal.

In an embodiment, in a case where the first channel access type or the second channel access type is used for performing channel access and the accessed channel is sensed to be idle in the sensing duration, the SL signal to be sent is sent, or a filling signal and the SL signal to be sent are sent. In an embodiment, in a case where the filling signal and the SL signal to be sent are sent, the filling signal may be sent firstly and then the SL signal to be sent may be sent, or the SL signal to be sent may be sent before the filling signal is sent. A length of the filling signal may be predefined, or may be configured by a base station or a network. In an embodiment, the filling signal may be a signal composed of a specific sequence such as various reference signals, or a normal or truncated data or a control channel signal, or a frequency domain comb-shaped sent signal, and the format of the filling signal is not limited in this embodiment.

In an embodiment, in a case where the sent SL signal satisfying the preset condition is detected, if the channel access procedure corresponding to the second channel access type has been started, then the current channel access type is switched to the first channel access type.

In an embodiment, the sent SL signal satisfying the preset condition being detected includes one of: at least one sent SL signal is detected at the previous occasion of the transmission resource; at least one sent SL signal is detected at the previous occasion of the transmission resource, and a time domain length of the transmission resource of the SL signal to be sent is within X symbols, where X is a positive integer greater than 2 and less than 7; at least one sent SL signal is detected at the previous occasion of the transmission resource, and the transmission resource of the SL signal to be sent is within a remaining channel occupied time (COT) indicated by the detected and sent SL signal; or at least one sent SL signal is detected at the previous occasion of the transmission resource, the transmission resource of the SL signal to be sent is within a remaining COT indicated by the detected and sent SL signal, and a priority of the SL signal to be sent is higher than or equal to a priority of the detected and sent SL signal.

In an embodiment, the sent SL signal satisfying the preset condition being detected at the previous occasion of the transmission resource corresponding to the SL signal to be sent means that the first communication node detects any sent SL signal at the previous occasion of the transmission resource. In an embodiment, when at least one sent SL signal is detected at the previous occasion of the transmission resource corresponding to the SL signal to be sent, it is considered that another UE has accessed to a channel in the vicinity of the UE corresponding to the SL signal to be sent, the UE corresponding to the SL signal to be sent may perform a fast channel access by using a channel access procedure corresponding to the first channel access type with a relatively shorter LBT duration, and when the accessed channel is detected to be idle, the UE corresponding to the SL signal to be sent may send its own SL signal.

In an embodiment, the sent SL signal satisfying the preset condition being detected at the previous occasion of the transmission resource corresponding to the SL signal to be sent means that the first communication node detects at least one sent SL signal at the previous occasion of the transmission resource, and the time domain length of the transmission resource of the SL signal to be sent is within X symbols. The time domain length of the transmission resource of the SL signal to be sent is within a number of symbols corresponding to the short signal, where X is a positive integer greater than 2 and less than 7.

In an embodiment, the sent SL signal satisfying the preset condition being detected at the previous occasion of the transmission resource corresponding to the SL signal to be sent means that at least one sent SL signal is detected at the previous occasion of the transmission resource, and the transmission resource of the SL signal to be sent is within the remaining channel occupied time (COT) indicated by the detected and sent SL signal. In an embodiment, when the UE corresponding to the SL signal to be sent detects the sent SL signal indicating the remaining COT, if the transmission resource of the SL signal to be sent is within the remaining COT, then the UE corresponding to the SL signal to be sent may share the remaining COT, so that the UE corresponding to the SL signal to be sent performs a fast channel access by using the channel access procedure corresponding to the first channel access type with a relatively shorter LBT duration, and when the UE corresponding to the SL signal to be sent detects that the accessed channel is idle, the UE corresponding to the SL signal to be sent may send its own SL signal.

In an embodiment, the sent SL signal satisfying the preset condition being detected at the previous occasion of the transmission resource corresponding to the SL signal to be sent means that at least one sent SL signal is detected at the previous occasion of the transmission resource, the transmission resource of the SL signal to be sent is within the remaining COT indicated by the detected and sent SL signal, and the priority of the SL signal to be sent is higher than or equal to the priority of the detected and sent SL signal. In an embodiment, when the UE corresponding to the SL signal to be sent detects the sent SL signal indicating the remaining COT, if the transmission resource of the SL signal to be sent is within the remaining COT, then the UE corresponding to the sent SL signal may share the remaining COT duration, so that the UE corresponding to the SL signal to be sent performs a fast channel access by using the channel access procedure corresponding to the first channel access type with a relatively shorter LBT duration, and when the UE corresponding to the SL signal to be sent detects that the accessed channel is idle, the UE corresponding to the SL signal to be sent may send its own SL signal. In an embodiment, when the UE corresponding to the SL signal to be sent detects, at the previous occasion of the transmission resource, that a sent SL signal of other UEs with the same priority occupies a channel, and the shared remaining COT contains the transmission resource of the UE corresponding to the SL signal to be sent, the UE corresponding to the SL signal to be sent uses the channel access procedure corresponding to the first channel access type to perform channel access.

In an embodiment, in a case where the number of remaining COTs corresponding to the detected at least one sent SL signal is at least two, the remaining COT indicated by the sent SL signal includes one of: a longest or shortest remaining COT among all remaining COTs; a longest or shortest remaining COT among remaining COTs corresponding to a detected and sent SL signal whose priority is equal to the priority of the SL signal to be sent; or a longest or shortest remaining COT among remaining COTs corresponding to a detected and sent SL signal whose priority is equal to or lower than the priority of the SL signal to be sent.

In an embodiment, the sent SL signal further satisfies one of the following conditions: power of the sent SL signal exceeds a detection threshold, or the power of the sent SL signal exceeds a detection threshold corresponding to the priority of the sent SL signal. In an embodiment, the sent SL signal may be configured with different priorities, that is, detection thresholds satisfying the preset condition are different. Exemplarily, if a sent SL signal with a low priority is detected, the detected and sent SL signal may be considered to be valid when the power of the sent SL signal with the low priority exceeds the detection threshold Y1; if a sent SL signal with a high priority is detected, the sent SL signal may be considered to be valid when the power of the sent SL signal with the high priority exceeds a detection threshold Y2. The detection thresholds corresponding to different priorities are different. The detection threshold Y1 and the detection threshold Y2 are different.

In an embodiment, the sent SL signal further satisfies one of the following conditions: the sent SL signal indicates an UE identification corresponding to the SL signal to be sent; or the UE corresponding to the SL signal to be sent is one of a group of UEs indicated by the sent SL signal.

In an embodiment, that one sent SL signal is detected further includes that: sidelink control information (SCI) carried in the sent SL signal is acquired, or a type of the sent SL signal is acquired.

In an embodiment, a type of the SL signal to be sent includes at least one of a physical sidelink control channel (PSCCH), a physical sidelink shared channel (PSSCH), a physical sidelink feedback channel (PSFCH), a sidelink synchronization signal/physical broadcast channel block (S-SSB), a sidelink channel state information reference signal (SL CSI-RS), and a sidelink positioning reference signal (SL PRS).

In an embodiment, the SL signal to be sent or both the filling signal and the SL signal to be sent carry at least one of a priority indication of the SL signal to be sent, an indication of a remaining COT, or an indication of whether to send the filling signal.

In an embodiment, the indication of the remaining COT includes one of: a difference value between a remaining COT indicated by the detected and sent SL signal and a duration of a transmission resource occupied by the SL signal to be sent; a remaining COT corresponding to the priority of the SL signal to be sent; or zero.

In an embodiment, a priority of the SL signal to be sent includes one of: a channel access priority class (CAPC) of the SL signal to be sent, or a prose per-packet priority (PPPP) carried by the SL signal to be sent.

In an embodiment, the previous occasion and the transmission resource corresponding to the SL signal to be sent are in a same slot, or the previous occasion is in a slot before a slot to which the transmission resource corresponding to the SL signal to be sent belongs.

In an embodiment, the transmission resource is determined in one of the following manners: the transmission resource corresponding to the SL signal to be sent is determined based on a scheduling of a second communication node; the transmission resource corresponding to the SL signal to be sent is autonomously selected from a resource pool; the transmission resource corresponding to the SL signal to be sent is determined based on a configuration of the second communication node; or the transmission resource corresponding to the SL signal to be sent is determined based on an associated SL signal.

Figure 3:
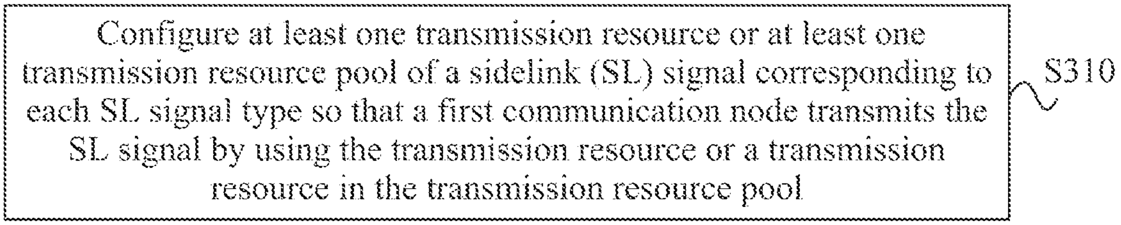
FIG. 3 is a flowchart of another channel access method according to an embodiment of the present application.

In an embodiment, FIG. 3 is a flowchart of another channel access method according to an embodiment of the present application. This embodiment may be performed by a channel access device. The channel access device may be a second communication node. The second communication node may be a network side or a base station side. As shown in FIG. 3, this embodiment includes S310.

In S310, at least one transmission resource or at least one transmission resource pool of a sidelink (SL) signal corresponding to each SL signal type is configured so that a first communication node transmits the SL signal by using the at least one transmission resource or a transmission resource in the at least one transmission resource pool.

In an embodiment, the second communication node configures at least one transmission resource or a transmission resource pool of the SL signal corresponding to each SL signal type, and sends the configuration information of the transmission resource or the transmission resource pool to the first communication node, so that the first communication node transmits the SL signal by using the received transmission resource or the transmission resource in the transmission resource pool.

In an embodiment, the configuration information of the transmission resource or the transmission resource pool includes at least one of the following: a resource position of the SL signal corresponding to each SL signal type in the resource pool and a channel access type corresponding to each SL signal type; a channel access priority level corresponding to the SL signal corresponding to each SL signal type; or a mapping relationship between a channel access priority level (CAPC) of the SL signal and a prose per-packet priority (PPPP) of the SL signal.

In an embodiment, the SL signal type includes one of: PSCCH, PSSCH, PSFCH, S-SSB, SL CSI-RS, or SL PRS. The channel access type includes one of a first channel access type or a second channel access type. A duration of a listen before talk (LBT) procedure performed in a channel access procedure corresponding to the first channel access type is a fixed value, and a duration of a LBT procedure performed in a channel access procedure corresponding to the second channel access type is a random value or a fixed value.

The channel access procedure is an LBT procedure performed prior to one transmission to be performed, and the LBT procedure corresponds to a random or determined LBT duration configured by a network. According to the channel access method in embodiments of the present application, the detection of the SL signal is firstly performed at the previous occasion of the transmission to be performed, and channel access and signal sending schemes are determined according to the detection result. For details, please refer to the description of the following embodiments.

In an embodiment, the SL signal detection is performed on the previous occasion of the transmission resource, the previous occasion of the transmission resource may be an occasion for PSCCH, PSSCH, PSFCH, S-SSB, SL CSI-RS, SL PRS or a combination of the foregoing. In an example, the transmission resource and the previous occasion are adjacent in physical time. The previous occasion may be in a same physical slot as the transmission resource, or in a previous physical slot of a slot to which the transmission resource belongs. The previous occasion may be in the same resource pool as the transmission resource, or may belong to different resource pools.

Figure 4:
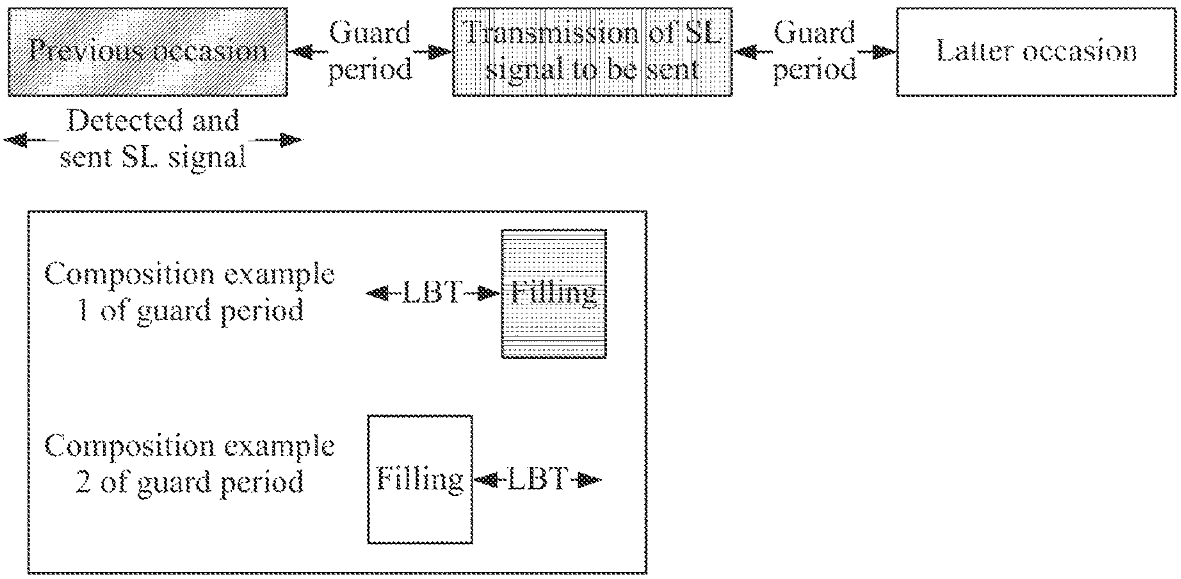
FIG. 4 is a schematic diagram showing an access of a channel access procedure according to an embodiment of the present application.

In an embodiment, FIG. 4 is a schematic diagram showing an access of a channel access procedure according to an embodiment of the present application. In an embodiment, the UE performs a channel access procedure (e.g., using Type 1 channel access procedure, or Type 2 channel access procedure) corresponding to the second channel access type in the above-described embodiments before the SL signal is sent. In another embodiment, when the UE detects the sent SL signal satisfying the preset condition at the previous occasion of the transmission resource corresponding to the SL signal to be sent, the UE uses the first channel access type (such as, Type 2 channel access procedure) to access the channel. The sending of the filling signal is described in the following examples.

In an example, the UE detects the sent SL signal at the previous occasion, and the end of the sent SL signal further includes a filling signal (the filling signal may also be referred to as an extended signal, and is subsequently referred to as a filling signal), then the UE may, after detecting the filling signal of the sent SL signal, perform an LBT channel access procedure before the SL signal to be sent (that is, the SL signal to be sent in the above-described embodiments), as shown in composition example 2 of in FIG. 4. In an example, the base station or network may configure whether the filling signal may be sent at the end of the SL signal when configuring the SL resource or the SL resource pool. In an example, the length of the filling signal is predefined, or the length of the filling signal is configured by the base station or network. In an example, the detected SL signal indicates whether the filling signal is sent. In an example, the detected SL signal also indicates the length of the sent filling signal.

In an example, the UE detects the sent SL signal at the previous occasion, the UE sends the signal after the channel access succeeds. The UE sends the filling signal firstly at the head of the SL signal, as shown in composition example 1 of guard period in FIG. 4. For example, another UE sends the data packet PSCCH/PSSCH in a previous slot, one guard period (GP) exists between before the transmission resource and the previous occasion according to the frame structure of the SL, the length of the GP may be a symbol. Since a length of one symbol is relatively long, devices of other networks may consider the channel to be idle in the idle GP, thereby seizing the channel, and causing the SL signal to be sent (SL signal to be sent) cannot be sent. In order to prevent this condition, the UE may start to perform channel access by using the Type 2 channel access type after the data packet is sent at the previous occasion, and send the filling signal firstly and then send the SL signal to be sent after detecting the channel is idle, so as to shorten the length of the GP and avoid other devices from seizing the channel. In an example, the base station or network may configure whether the filling signal may be sent at the head of the SL signal when the SL resource or the SL resource pool is configured. In an example, the length of the filling signal is predefined, or the length of the filling signal is configured by the base station or the network. In an example, the UE may send the filling signal at the end of the SL signal to be sent, and may also indicate whether the filling signal has been sent and the length of the filling signal in the SL signal to be sent.

In an example, the filling signal may be a signal composed of a specific sequence such as various reference signals, or a normal or truncated data or a control channel signal, or a frequency domain comb-shaped sent signal, or an extended cyclic prefix signal, that is, the format of the filling signal is not limited.

As described in the above-described embodiments, when determining that the channel is idle in the LBT procedure, the UE may send only the SL signal to be sent, or may send the filling signal at the head of the SL signal to be sent, and/or at the end of the SL signal to be sent.

In an embodiment, the UE performs a channel access procedure (e.g., using Type 1 channel access procedure) corresponding to the second channel access type in the above-described embodiments before the SL signal is sent. In another embodiment, when the UE detects the sent SL signal satisfying the preset condition at the previous occasion of the transmission resource corresponding to the SL signal to be sent, the first channel access type (such as, Type 2 channel access procedure) is used to access a channel. The sent SL signal satisfying the preset condition being detected will be described in the following instances.

In an example, the UE detects the sent SL signal satisfying the preset condition at the previous occasion of the transmission resource corresponding to the SL signal to be sent means that the UE detects any sent SL signal at the previous occasion of the transmission resource. For example, if any sent SL signal is detected, then it is considered that another UE (UE corresponding to the sent SL signal) has accessed to the channel in the vicinity, and the UE may perform a fast channel access by using the first channel access type with a short LBT duration. If the channel is detected to be idle after the channel is accessed, then the UE may send its own SL signal (that is, the SL signal to be sent). For example, the rule may be used when the SL signals to be sent are relatively shorter SL signals (the time domain length is within X symbols, where X is a positive integer greater than 2 and less than 7, such as SL PRS, SL PSFCH, SL CSI-RS), the resources of these short signals are generally in the same slot as the resource at the previous occasion, or are special SL signals (synchronization signals, discovery signals, and the like).

In an example, the UE detects the sent SL signal satisfying the preset condition at the previous occasion of the transmission resource corresponding to the SL signal to be sent means that the UE detects the sent SL signal at the previous occasion of the transmission resource, the detected and sent SL signal indicates a remaining COT, and the transmission resource of the SL signal to be sent is within the remaining COT. For example, when the UE detects the sent SL signal indicating the remaining COT duration, if the sending of the SL signal to be sent by the UE is within the remaining COT, then the UE may share the remaining COT and may perform a fast channel access by using the first channel access type with a relatively shorter LBT duration. If detecting that the channel is idle after accessing the channel, the UE may send its own SL signal. In an example, when the UE sends its own SL signal, it is ensured that the transmission is completed within the remaining COT duration. In an embodiment, the COT sharing is also limited, for example, the protocol predefines or the base station/network configures the duration of the COT with a maximum limit, so that the SL UE can be prevented from occupying the channel for an excessively long time. The UE may use the first channel access type only when the UE detects that the signal of another SL UE occupies the channel at the previous occasion of the transmission resource and the shared remaining COT covers the sending of the UE, otherwise the UE still performs channel access by using the second channel access type if the remaining COT is too short or 0.

In an example, the UE detects the sent SL signal satisfying the preset condition at the previous occasion of the transmission resource corresponding to the SL signal to be sent means that at least one sent SL signal is detected at the previous occasion of the transmission resource, the transmission resource of the SL signal to be sent is within the remaining COT indicated by the detected and sent SL signal, and the priority of the SL signal to be sent is equal to the priority of the detected and sent SL signal. For example, if the UE detects the sent SL signal satisfying the preset condition, then the UE may share the remaining COT and may perform a fast channel access by using the first channel access type with a relatively shorter LBT duration. If detecting that the channel is idle after accessing the channel, the UE may send its own SL signal (that is, the SL signal to be sent). In an example, when the UE sends its own SL signal, it is ensured that the transmission is completed within the remaining COT. In an embodiment, the COT sharing may also be described based on priority, for example, the protocol predefines or the base station/network configures the duration of the COT with a maximum COT, and different priorities (such as, different CAPCs) have different COT limits, so that channel occupied times may be shared between SL signals having the same priority. The UE may use the first channel access type only when the UE detects that the signal of another SL UE with the same priority occupies the channel at the previous occasion of the transmission resource, and the shared remaining COT covers the sending of the UE, otherwise, the UE still performs channel access by using the second channel access type.

In an example, the UE detects the sent SL signal satisfying the preset condition at the previous occasion of the transmission resource corresponding to the SL signal to be sent means that at least one sent SL signal is detected at the previous occasion of the transmission resource, the transmission resource of the SL signal to be sent is within the remaining COT indicated by the detected and sent SL signal, and the priority of the SL signal to be sent is higher than or equal to the priority of the detected and sent SL signal. For example, if the UE detects the SL signal satisfying the preset condition, then the UE may share the remaining COT and may perform a fast channel access by using the first channel access type with a relatively shorter LBT duration. If detecting the channel is idle after accessing the channel, the UE may send its own SL signal. In an example, when the UE sends its own SL signal, it is ensured that the transmission is completed within the remaining COT. In an embodiment, the COT sharing may also be described based on priority, for example, the protocol predefines or the base station/network configures the duration of the COT with a maximum limit, where different priorities (such as, different CAPCs) have different COT limits, so that the UE (i.e., the device corresponding to the SL signal to be sent) may share the channel occupied time of the sent SL signal whose priority is equal to or lower than its own priority.

In an example, the sent SL signal also satisfies one of the following conditions: the power of the sent SL signal exceeds a detection threshold; or the power of the sent SL signal exceeds the detection threshold corresponding to the priority of the sent SL signal. In an example, the network or base station may set a detection threshold, and it is considered that the detected and sent SL signal is valid when the sent SL signal detected by the UE exceeds the detection threshold. In an example, the network or base station may set a detection threshold for each priority, and the detected and sent SL signal is considered to be valid only when the detected and sent SL signal exceeds the detection threshold corresponding to its priority. In an example, the detection threshold is a reference signal receiving power (RSRP) detection threshold, such as a demodulation reference signal (DMRS) detection threshold for a control or data channel.

In an example, that the sent SL signal is detected may further include that: sidelink control information (SCI) carried by the sent SL signal is acquired; or the type of the sent SL signal is acquired. In an embodiment, both the remaining COT and SL signal priorities may be carried in the SCI. The type of the sent SL signal includes one of a physical sidelink control channel (PSCCH), a physical sidelink shared channel (PSSCH), a physical sidelink feedback channel (PSFCH), a sidelink synchronization signal/physical broadcast channel block (S-SSB), a sidelink channel state information reference signal (SL CSI-RS), or a sidelink positioning reference signal (SL PRS).

In an example, the sent SL signal further satisfies one of the following conditions: the sent SL signal indicates an UE identification corresponding to the SL signal to be sent, or the UE corresponding to the SL signal to be sent is one of a group of UEs indicated by the sent SL signal. In an embodiment, the UE identification or the information of the indicated group of UEs is carried in the SCI. For example, only if the UE is a UE that is allowed to use the remaining COT or a UE in the group of UEs that are allowed to use the remaining COT, the UE may perform a fast channel access by using the first channel access type with a relatively shorter LBT duration.

In an embodiment, the remaining COT indicated by the detected and sent SL signal refers to the remaining COT indicated in the SCI carried by the detected and sent SL signal.

In an example, the remaining COT indicates a number of slots included in the remaining COT. For example, a counter of the remaining slots may be indicated, and when the counter or timer is 0, it is indicated that the COT has ended or no COT sharing is performed. In an example, the network or the base station may configure whether the COT sharing is enabled, and such configuration may be configured for each resource pool or each group of resources. In an example, the UE may also choose to close the COT sharing, for example, the UE may not indicate the remaining COT in the sent SL signal or may set the indicated remaining COT to be zero.

In an example, in a case where the number of the remaining COTs indicated by the detected and sent SL signal is multiple, the duration of the remaining COT indicated by the detected and sent SL signal refers to the longest or shortest remaining COT among the multiple remaining COTs. For example, the UE may detect a sent SL signal sent by the multiple UEs on the previous occasion of the transmission resource, and the remaining COT carried in the sent SL signal may be multiple. In an example, if a more conservative method is used, the transmission of the UE needs to be within all the indicated remaining COTs, i.e., within the shortest remaining COT. In an example, if a more aggressive method is used, the transmission of the UE only needs to be within the longest remaining COT.

In an example, in a case where the number of the remaining COTs indicated by the detected and sent SL signal is multiple, the priority of the detected and sent SL signal and the priority of the SL signal to be sent are determined when the remaining COTs indicated by the detected and sent SL signal is determined. In an example, the UE may share the remaining COTs with the same priority as the SL signal to be sent. For example, the detected and sent SL signal may include SL signals having the same priority as the SL signal to be sent, and the SL signals sent by the UE are within the longest or shortest remaining COT indicated by the sent SL signals with the same priority.

In an example, in a case where the number of the remaining COTs indicated by the detected and sent SL signal is multiple, the UE may share the remaining COTs with the same priority as the SL signal to be sent, or with a lower priority than the SL signal to be sent when determining the remaining COTs indicated by the detected and sent SL signal. For example, the detected and sent SL signal may include the sent SL signal having the same priority as the SL signal to be sent, and/or the sent SL signal having a lower priority than the SL signal to be sent, and the SL signal to be sent transmitted by the UE is within the longest or shortest remaining COT indicated by the sent SL signal having the same or lower priority.

In an example, if the UE performs channel access by using the second channel access type, the remaining COT carried by the UE is the COT duration corresponding to the priority of the SL signal to be sent. For example, if the UE does not detect the sent SL signal satisfying the preset condition, then the UE performs access using the channel access procedure corresponding to the second channel access type and succeeds. At this time, the UE starts one COT, and the remaining COTs are set by the UE according to the priorities of the signals sent by the UE.

In an example, if the UE performs channel access by using the first channel access type, the duration of the remaining COT carried by the UE is the remaining COT duration indicated by the detected and sent SL signal minus the duration occupied by the SL signal to be sent corresponding to the UE. For example, if the UE detects the sent SL signal satisfying the preset condition, then the UE performs access by using the channel access procedure corresponding to the first channel access type and succeeds. In this case, it may be considered that the UE shares one COT that is enabled by another UE and the UE itself does not enable a new COT, then the remaining COT carried by the sent SL signal to be sent is the remaining COT indicated by the detected and sent SL signal minus an occupied duration of the SL signal to be sent by the UE.

In an example, if the UE performs channel access by using the first channel access type or the second channel access type described above, it does not carry an indication of the remaining COT, or the carried remaining COT is set to be 0. For example, the UE disables the COT sharing.

In an embodiment, different SL signals to be sent correspond to different priorities. In an example, the priority of the SL signal to be sent may be PPPP. For example, for an SL data packet (PSCCH/PSSCH) corresponding to each SL signal to be sent, one PPPP may be bound according to its service attribute, whose value is 1~8. A smaller value represents a higher priority, i.e., high priority may be equivalent to a small priority number or a low priority number. For some particular SL signals to be sent such as S-SSB, PSFCH, SL PRS, it is necessary to additionally determine their corresponding PPPPs. In an example, the PPPPs of the SL signals to be sent may be configured by a base station or a network, such as the priorities of S-SSB, PSFCH, SL PRS. In an example, the priority of the SL signal to be sent is determined by the PPPP of other SL signals that trigger or associate the signal. For example, the PPPP of the PSFCH is set to be the PPPP used for the SL data packet to which it responds, and the PPPP of the SL PRS is also the same as its associated SL packet (PSCCH/PSCCH).

In an example, the priority of the SL signal to be sent may be CAPC. For example, for an SL data packet (PSCCH/PSSCH) corresponding to each SL signal to be sent, one CAPC may be bound according to its service attribute, whose value is 1 to 4. A smaller value represents a higher priority, that is, a high priority may be equivalent to a small priority sequence number or a low priority sequence number.

In an example, the priority of the SL signal to be sent may be CAPC, and there is a mapping relationship between PPPP and CAPC. For example, each PPPP corresponds to one of four CAPCs, and PPPP with high priority corresponds to CAPC with high priority. For example, for SL data packet (PSCCH/PSSCH) corresponding to each SL signal to be sent, one PPPP may be bound according to its traffic attribute, and then the CAPC of the data packet may be determined according to the mapping relationship between the PPPP and the CAPC.

In an example, the priority of the SL signal to be sent may be CAPC. For example, for some particular SL signals to be sent such as S-SSB, PSFCH, SL PRS, it is necessary to additionally determine their corresponding CAPCs. In an example, the CAPC of the SL signal to be sent may be configured by the base station or the network, or the protocol is predefined, for example, the CAPC of S-SSB, PSFCH, SL PRS is determined by the configuration. In an example, the priority of the SL signal to be sent is determined by the CAPC of other SL signals that trigger or associate the signal. For example, the CAPC of PSFCH is set to be the CAPC used for the SL packet that it responds, and the CAPC of SL PRS is also the same as its associated SL packet (PSCCH/PSSCH). In an example, the PPPP of the SL signal to be sent may be configured by a base station or a network such as the PPPP of S-SSB, PSFCH, SL PRS, and the CAPC may be determined according to the mapping relationship. In an example, the PPPPs of SL signals to be sent are determined by the PPPP of other SL signals that trigger or associate these signals, and then the CAPCs of these signals may be determined according to the mapping relationships.

In an embodiment, the UE firstly determines a transmission resource corresponding to the SL signal to be sent before transmitting the SL signal to be sent. In an embodiment, the transmission resource are acquired and determined in one of the following manners: the transmission resource corresponding to the SL signal to be sent is determined based on a scheduling of a second communication node; the transmission resource corresponding to the SL signal to be sent is autonomously selected from a resource pool; the transmission resource corresponding to the SL signal to be sent is determined based on a configuration of the second communication node; or the transmission resource corresponding to the SL signal to be sent is determined based on an associated SL signal.

In an embodiment, the transmission resource is determined in the following manners.

In an example, the UE determines the transmission resource corresponding to the SL signal to be sent based on a scheduling of the base station or a central node (such as, a group head node). For example, the base station or the central node allocates or schedules specific transmission resources for the UE.

In an example, the UE autonomously selects the transmission resource corresponding to the SL signal to be sent in the resource pool. In an embodiment, the UE may randomly select the transmission resource corresponding to the SL signal to be sent in the resource pool based on sensing or partial sensing.

In an example, the UE determines a transmission resource corresponding to the SL signal to be sent based on a configuration of the base station or the network. For example, the resource of the S-SSB may be configured by the network or the base station.

In an example, the UE determines the transmission resource corresponding to the SL signal to be sent based on other associated SL signals. There is a certain association between the resources of other associated SL signals and the SL signal to be sent, for example, when the UE detects a data packet sent to itself, and the data packet requires feedback, then the resource used by the feedback is determined by the associated data packets. Generally, there is a determined mapping relationship the resource of the data packet and the feedback resource have a determined mapping relationship. In an example, the feedback may be PSFCH, SL PRS, or SL CSI-RS.

In an embodiment, a procedure of channel access of the SL synchronization signal is described. In an embodiment, the network or the base station may configure or preconfigure the resources used by the SL synchronization signal, and periodically configure resources of one or more groups of SL synchronization signals on each carrier or each bandwidth part (BWP) of each carrier. In addition, the network or the base station may also configure the channel access priority of the synchronization signal, for example, may configure the CAPC of the S-SSB, or the S-SSB may be any CAPC, and the S-SSB may perform COT sharing with SL signals of any priority so as to perform the COT sharing with other SL signals. An example in which S-SSB is used as the synchronization signal is used for description.

A group of S-SSB resources may include multiple S-SSB resources, each S-SSB resource may be viewed as a potential occasion sent by one S-SSB, and the multiple S-SSB resources may be distributed continuously in time or discretely. One S-SSB resource may occupy a slot or a number of symbols on a slot in time. Multiple S-SSB resources may also be included on one slot. The UE may send S-SSB synchronization signals on these S-SSB resources.

In an embodiment, a channel access manner of the S-SSB may be predefined, or the channel access manner of the S-SSB is directly configured to the Type 2A type, and the corresponding LBT duration is 25 us (25 microseconds). In addition to the conventional LBT, the UE may perform a detection of the sent SL signal at a previous occasion of one transmission resource the S-SSB, for example, a previous occasion of the transmission resource corresponding to the SL signal to be sent may be a PSCCH/PSSCH resource or a PSFCH resource in a previous slot, or a previous S-SSB resource in the same slot as the S-SSB.

In an example, the UE performs a Type 2A channel access (the second channel access type described above) before sending the S-SSB. In another example, if the UE detects the sent SL signal at the previous occasion before sending the S-SSB, the UE uses the Type 2B or Type 2C access channel (the first channel access Type), that is, the corresponding LBT duration becomes 16 us.

In an embodiment, in a case where the UE performs a channel access by using the first channel access type or the second channel type, the UE may perform the channel access and sending of the S-SSB using one or a combination of the above-described embodiments.

In an example, if the UE detects the sent SL signal at the previous occasion, then the UE may send the S-SSB by using the Type 2A/2B/2C. Where S-SSB is a special signal and the limit of the remaining COT may be ignored. In an example, S-SSB carries an indication of the remaining COT, or the remaining COT is 0.

In an example, the S-SSB may share COTs of all priorities, and similarly, in order to achieve the COT sharing, an indication of the remaining COTs needs to be added to the S-SSB.

In an embodiment, the channel access procedure of the sidelink data is described. In an embodiment, the network or the base station may configure or preconfigure a resource pool used for SL data communication, and the network or the base station may configure one or more sending resource pools or receiving resource pools for SL data communication on each carrier or on each BWP of each carrier. In one resource pool, in addition to configuring resources of the control channel and the data channel used for SL data communication, resources of a feedback channel, such as resources of a PSFCH, may also be configured, and resources of a SL reference signal, such as resources of a SL PRS, may also be configured.

In an embodiment, PSCCH and PSSCH may be sent together, and their channel access procedures are also together. The UE may perform channel access and sending of the PSCCH and the PSSCH by using the channel access schemes in the above-described embodiments.

In an example, the UE performs a Type 1 channel access procedure (the second channel access type described above) before the PSCCH/PSSCH is sent, and different data priorities correspond to Type 1 channel access procedures of different parameters. In another example, if the UE detects the sent SL signal satisfying the preset condition at the previous occasion of the transmission of the PSCCH/PSSCH, the UE uses the Type 2A, Type 2B, or Type 2C access channel (the first channel access type), that is, the corresponding LBT duration becomes a definite value.

In an embodiment, the access of the data channel limits the COT sharing duration. In an embodiment, the priority of the SL signal to be sent may also be configured.

Figure 5:
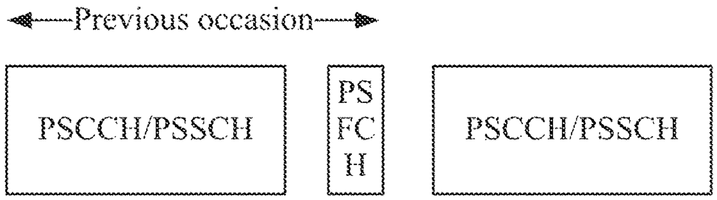
FIG. 5 is a schematic diagram showing a component of a sent SL signal satisfying a preset condition according to an embodiment of the present application.

In an example, FIG. 5 is a schematic diagram showing a component of a sent SL signal satisfying a preset condition according to an embodiment of the present application. As shown in FIG. 5, the occasion of detecting the sent SL signal satisfying the preset condition by the UE, that is, the previous occasion, is a combined slot or a combined occasion containing a PSCCH/PSSCH occasion and a PSFCH occasion. As described in the above-described examples, the UE detects the PSCCH/PSSCH signal in the previous slot of the transmission resource, if necessary, detects the priority indication and/or the indication of the remaining COT contained therein. In an example, in addition to detecting the priority indication contained and/or the indication of the remaining COT in PSCCH/PSSCH, the UE also needs to detect the PSFCH signal, and if PSFCH exists, then the UE uses the first channel access type, otherwise the UE uses the second channel access type. In an example, the PSFCH described above may also be other SL signals, such as reference signals such as SL PRS.

In an embodiment, for channel access of the SL feedback channel reference signal, PSFCH is used as an example, and the scheme in this embodiment is applicable to other SL channels or SL reference signals (such as, SL PRS).

In an embodiment, the network or the base station may configure or pre-configure the resource pool used by the SL communication so as to configure one or more sending resource pools or receiving resource pools for the SL communication on each carrier or on each BWP of each carrier. In one resource pool, in addition to configuring the resources of the control channel and the data channel used by the SL communication, the resources of the feedback channel such as the resources of the PSFCH, and the resources of the SL reference signal such as the resources of the SL PRS may also be configured.

In an embodiment, the UE defaults to use Type 1 channel access (the second channel access type described above) to send the PSFCH, where different data priorities correspond to Type 1 channel access with different parameters. However, PSFCH is not a data channel and has no direct priority. In an example, PSFCH has the same priority as its associated PSCCH/PSSCH to be fed back. Alternatively, the PSFCH uses a priority predetermined by the protocol, for example, if the PSFCH has a short duration, the CAPC access channel with the highest priority may be predefined, or the PSFCH uses the priority configured by the network or the base station.

One PSFCH resource or occasion may occupy several symbols (such as, two symbols) in one slot, and resources or occasions for other SL signals may also exist in the same slot. For example, PSCCH/PSSCH resources may also exist, as shown in FIG. 5. A previous occasion of one PSFCH resource may be other SL signal resources in the same slot, such as PSCCH/PSSCH resources in the same slot.

In an example, the UE performs Type 1 channel access (the second channel access type described above) before sending the PSFCH. In another example, when the UE detects the sent SL signal at the previous occasion before sending the PSFCH, for example, the UE detects PSCCH/PSCCH in the same slot, then the UE uses the Type 2A, Type 2B or Type 2C access channel (first type of channel access), that is, the corresponding LBT duration becomes a definite value. In an embodiment, if the UE detects the sent SL signal in the previous occasion, the UE may use Type 2A/2B/2C for the transmission of the PSFCH. The signal of the PSFCH is relatively shorter, within one slot, if other SL signals are detected in a same slot, a channel access method with a relatively shorter LBT duration may be used. The limit of the remaining COT is not considered at this time.

In an embodiment, in a case where the UE performs a channel access by using the first channel access type or the second channel type, the UE may perform channel access and transmission of signals such as PSFCH and SL-PRS by using one or a combination of the above-described embodiments.

Figure 6:
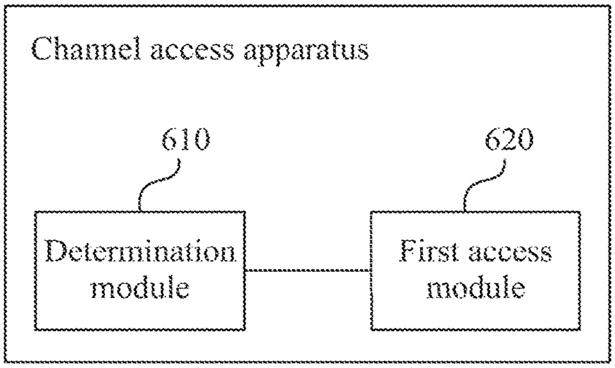
FIG. 6 is a structural block diagram of a channel access apparatus according to an embodiment of the present application.

In an embodiment, FIG. 6 is a structural block diagram of a channel access apparatus according to an embodiment of the present application. This embodiment applies to a first communication node. As shown in FIG. 6, this embodiment includes a determination module 610 and a first access module 620.

The determination module 610 is configured to determine a transmission resource corresponding to an SL signal to be sent. The first access module 620 is configured to perform channel access by using a first channel access type in a case where a sent SL signal satisfying a preset condition is detected at a previous occasion of the transmission resource, where a sensing duration of a channel access procedure corresponding to the first channel access type is a fixed value In an embodiment, the channel access apparatus applied to the first communication node further includes a second access module. The second access module is configured to perform channel access by using a second channel access type in a case where the sent SL signal satisfying the preset condition is not detected at the previous occasion of the transmission resource, where a sensing duration of a channel access procedure corresponding to the second channel access type is a random value or a fixed value.

In an embodiment, in a case where the first channel access type or the second channel access type is used for performing channel access and an accessed channel is sensed to be idle in the sensing duration, the SL signal to be sent is sent, or a filling signal and the SL signal to be sent are sent.

In an embodiment, in a case where the sent SL signal satisfying the preset condition is detected, if a channel access procedure corresponding to a second channel access type has been started, then a current channel access type is switched to the first channel access type.

In an embodiment, the sent SL signal satisfying the preset condition being detected includes one of: at least one sent SL signal is detected at the previous occasion of the transmission resource; at least one sent SL signal is detected at the previous occasion of the transmission resource, and a time domain length of the transmission resource of the SL signal to be sent is within X symbols, where X is a positive integer greater than 2 and less than 7; at least one sent SL signal is detected at the previous occasion of the transmission resource, and the transmission resource of the SL signal to be sent is within a remaining channel occupied time (COT) indicated by the detected and sent SL signal; or at least one sent SL signal is detected at the previous occasion of the transmission resource, the transmission resource of the SL signal to be sent is within a remaining COT indicated by the detected and sent SL signal, and a priority of the SL signal to be sent is higher than or equal to a priority of the detected and sent SL signal.

In an embodiment, in a case where the number of remaining COTs corresponding to the detected at least one sent SL signal is at least two, the remaining COT indicated by the sent SL signal includes one of: a longest or shortest remaining COT among all remaining COTs; a longest or shortest remaining COT among remaining COTs corresponding to a detected and sent SL signal whose priority is equal to the priority of the SL signal to be sent; or a longest or shortest remaining COT among remaining COTs corresponding to a detected and sent SL signal whose priority is equal to or lower than the priority of the SL signal to be sent.

In an embodiment, the sent SL signal further satisfies one of the following conditions: power of the sent SL signal exceeds a detection threshold, or the power of the sent SL signal exceeds a detection threshold corresponding to the priority of the sent SL signal.

In an embodiment, one sent SL signal being detected further includes: sidelink control information (SCI) carried in the sent SL signal is acquired, or a type of the sent SL signal is acquired.

In an embodiment, a type of the SL signal to be sent includes at least one of a physical sidelink control channel (PSCCH), a physical sidelink shared channel (PSSCH), a physical sidelink feedback channel (PSFCH), a sidelink synchronization signal/physical broadcast channel block (S-SSB), a sidelink channel state information reference signal (SL CSI-RS), and a sidelink positioning reference signal (SL PRS).

In an embodiment, the SL signal to be sent or both the filling signal and the SL signal to be sent carry at least one of: a priority indication of the SL signal to be sent, an indication of a remaining channel occupied time (COT), or an indication of whether to send the filling signal.

In an embodiment, the indication of the remaining COT includes one of: a difference value between a remaining COT indicated by the detected and sent SL signal and a duration of a transmission resource occupied by the SL signal to be sent; a remaining COT corresponding to the priority of the SL signal to be sent; or zero.

In an embodiment, a priority of the SL signal to be sent includes one of: a channel access priority class (CAPC) of the SL signal to be sent, or a prose per-packet priority (PPPP) carried by the SL signal to be sent.

In an embodiment, the previous occasion and the transmission resource corresponding to the SL signal to be sent are in a same slot, or the previous occasion is in a slot before a slot to which the transmission resource corresponding to the SL signal to be sent belongs.

In an embodiment, the transmission resource is determined in one of the following manners includes one of: the transmission resource corresponding to the SL signal to be sent is determined based on a scheduling of a second communication node; the transmission resource corresponding to the SL signal to be sent is autonomously selected from a resource pool; the transmission resource corresponding to the SL signal to be sent is determined based on a configuration of the second communication node; or the transmission resource corresponding to the SL signal to be sent is determined based on an associated SL signal.

The channel access apparatus provided in this embodiment is configured to implement the channel access method applied to the first communication node in the embodiment shown in FIG. 2, and the implementation principle and the technical effect of the channel access apparatus provided in this embodiment are similar the method, and are not described herein again.

Figure 7:
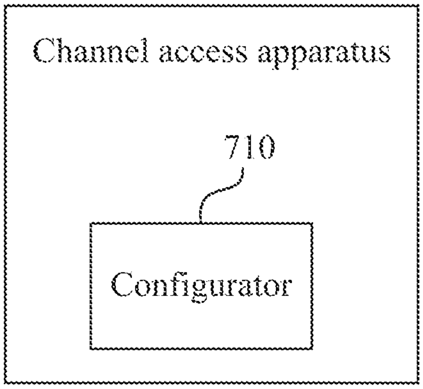
FIG. 7 is a structural block diagram of another channel access apparatus according to an embodiment of the present application.

In an embodiment, FIG. 7 is a structural block diagram of another channel access apparatus according to an embodiment of the present application. This embodiment applies to a second communication node. As shown in FIG. 7, this embodiment includes a configurator 710.

The configurator 710 is configured to configure at least one transmission resource or at least one transmission resource pool of a sidelink (SL) signal corresponding to each SL signal type so that a first communication node transmits the SL signal by using the at least one transmission resource or a transmission resource in the at least one transmission resource pool.

In an embodiment, configuration information of the at least one transmission resource or the at least one transmission resource pool includes at least one of: a resource position of the SL signal corresponding to the each SL signal type in the at least one resource pool and a channel access type corresponding to the each SL signal type; a channel access priority level corresponding to the SL signal corresponding to the each SL signal type; or a mapping relationship between a channel access priority level (CAPC) of the SL signal and a prose per-packet priority (PPPP) of the SL signal.

In an embodiment, the SL signal type includes one of a physical sidelink control channel (PSCCH), a physical sidelink shared channel (PSSCH), a physical sidelink feedback channel (PSFCH), a sidelink synchronization signal/physical broadcast channel block (S-SSB), a sidelink channel state information reference signal (SL CSI-RS), or a sidelink positioning reference signal (SL PRS). The channel access type includes one of a first channel access type or a second channel access type, a duration of sending a listen before talk (LBT) procedure performed in a channel access procedure corresponding to the first channel access type is a fixed value, and a duration of sending a LBT procedure performed in a channel access procedure corresponding to the second channel access type is a random value or a fixed value.

The channel access apparatus provided in this embodiment is configured to implement the channel access method applied to the second communication node in the embodiment shown in FIG. 3, and the implementation principle and the technical effect of the channel access apparatus provided in this embodiment are similar the method, and are not described herein again.

Figure 8:
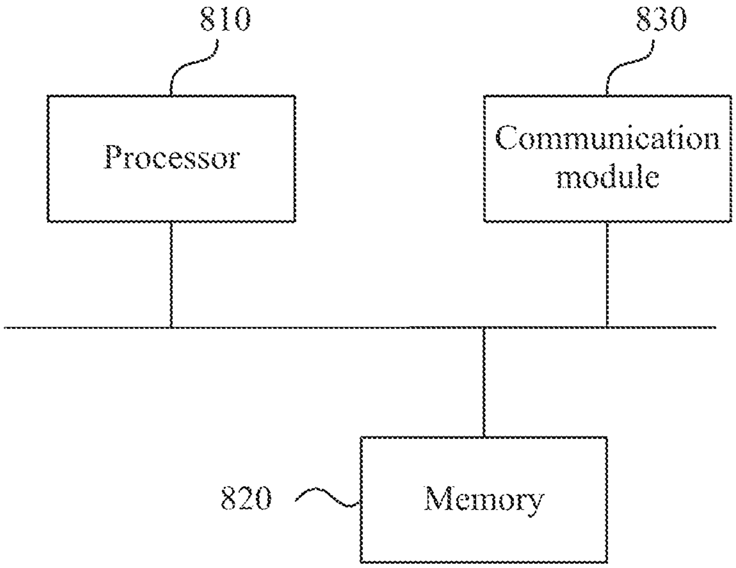
FIG. 8 is a schematic structural diagram of a channel access device according to an embodiment of the present application.

FIG. 8 is a schematic structural diagram of a channel access device according to an embodiment of the present application. As shown in FIG. 8, the device provided in the present application includes a processor 810, a memory 820 and a communication module 830. The number of processors 810 in the device may be one or more, such as one processor 810 in FIG. 8. The number of memories 820 in the device may be one or more, such as one memory 820 in FIG. 8. The processor 810, the memory 820, and the communication module 830 of the device may be connected via a bus or other manners, such as via a bus as shown in FIG. 8. In this embodiment, the channel access device may be a first communication node, where the first communication node may be a terminal side (such as, a user equipment).

The memory 820, as a computer-readable storage medium, may be configured to store software programs, computer-executable programs, and modules, such as program instructions/modules corresponding to the device in any of the embodiments of the present application (such as, the determination module 610 and the first access module 620 in the channel access apparatus). The memory 820 may include a storage program region and a storage data region, the storage program region may store an operating system, and an application program required for at least one function. The storage data region may store data created according to use of the device, etc. In addition, the memory 820 may include a high speed random access memory, and may also include a non-volatile memory, such as at least one magnetic disk storage device, a flash memory device, or other non-volatile solid state storage devices. In some instances, the memory 820 may include a memory disposed remotely relative to the processor 810, which may be connected to the device via a network. Instances of such networks include, but are not limited to, the Internet, enterprise intranets, local area networks, mobile communication networks, and combinations thereof.

The communication module 830 is configured to perform a communication interaction between the first communication node and the second communication node.

In a case where the channel access device is the first communication node, the device described above may be configured to perform the channel access method applied to the first communication node provided in any of the above-described embodiments, and has corresponding functions and effects.

In a case where the channel access device is the second communication node, the above-described device may be configured to perform the channel access method applied to the second communication node provided in any of the above-described embodiments, and has corresponding functions and effects.

An embodiment of the present application further provides a storage medium including a computer-executable instruction. The computer-executable instruction is configured to perform, when executed by a computer processor, the channel access method applied to the first communication node. The method includes that: a transmission resource corresponding to a sidelink (SL) signal to be sent is determined; and channel access is performed by using a first channel access type in a case where a sent SL signal satisfying a preset condition is detected at a previous occasion of the transmission resource, where a sensing duration of a channel access procedure corresponding to the first channel access type is a fixed value.

An embodiment of the present application further provides a storage medium including a computer-executable instruction. The computer-executable instruction is configured to perform, when executed by a computer processor, the channel access method applied to the second communication node. The method includes that: at least one transmission resource or at least one transmission resource pool of a sidelink (SL) signal corresponding to each SL signal type is configured so that a first communication node transmits the SL signal by using the at least one transmission resource or a transmission resource in the at least one transmission resource pool.

It should be understood by those skilled in the art that the term "user equipment" covers any suitable type of wireless user equipment, such as a mobile phone, a portable data processing apparatus, a portable web browser or a vehicle-mounted mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, a microprocessor or other computing apparatus, although the present application is not limited thereto.

Embodiments of the present application may be implemented in a manner that a data processor of a mobile apparatus executes computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program processes, or may represent interconnected logic circuits, modules, and functions, or may represent a combination of program processes and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), and the like. Computer-readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. A channel access method, applied to a first communication node, comprising:

determining a transmission resource corresponding to a sidelink (SL) signal to be sent; and in a case where a sent SL signal satisfying a preset condition is detected at a previous occasion of the transmission resource, performing channel access by using a first channel access type, wherein a sensing duration of a channel access procedure corresponding to the first channel access type is a fixed value;

wherein the sent SL signal satisfying the preset condition being detected comprises one of: the transmission resource of the SL signal to be sent is within a remaining channel occupied time (COT) indicated by the detected and sent SL signal; or the transmission resource of the SL signal to be sent is within a remaining COT indicated by the detected and sent SL signal, and a priority of the SL signal to be sent is higher than or equal to a priority of the detected and sent SL signal;

wherein the first communication node is a user equipment (UE) that is allowed to use the remaining COT indicated by the detected and sent SL signal, and an UE identification corresponding to the SL signal to be sent is indicated by the sent SL signal; or the first communication node is a UE of a group of UEs that are allowed to use the remaining COT indicated by the detected and sent SL signal, and information of the group of UEs is indicated by the sent SL signal.

2. The method of claim 1, further comprising:

in a case where the sent SL signal satisfying the preset conditions is not detected at the previous occasion of the transmission resource, performing channel access by using a second channel access type, wherein a sensing duration of a channel access procedure corresponding to the second channel access type is a random value or a fixed value.

3. The method of claim 2, further comprising:

in a case where the first channel access type or the second channel access type is used for performing channel access and an accessed channel is sensed to be idle in the sensing duration, sending the SL signal to be sent, or sending a filling signal and the SL signal to be sent.

4. The method of claim 1, further comprising:

in a case where the sent SL signal satisfying the preset condition is detected and a channel access procedure corresponding to a second channel access type has been started, switching a current channel access type to the first channel access type.

5. The method of claim 1, wherein one sent SL signal being detected comprises:

sidelink control information (SCI) carried in the sent SL signal is acquired, or a type of the sent SL signal is acquired.

6. The method of claim 1, wherein a type of the SL signal to be sent comprises at least one of a physical sidelink control channel (PSCCH), a physical sidelink shared channel (PSSCH), a physical sidelink feedback channel (PSFCH), a sidelink synchronization signal/physical broadcast channel block (S-SSB), a sidelink channel state information reference signal (SL CSI-RS), and a sidelink positioning reference signal (SL PRS).

7. The method of claim 3, wherein the SL signal to be sent or both the filling signal and the SL signal to be sent carry at least one of: a priority indication of the SL signal to be sent, an indication of the COT, or an indication of whether to send the filling signal.

8. The method of claim 7, wherein the indication of the remaining COT comprises one of:

a difference value between the remaining COT indicated by the detected and sent SL signal and a duration of a transmission resource occupied by the SL signal to be sent;

a remaining COT corresponding to the priority of the SL signal to be sent; or zero.

9. The method of claim 7, wherein a priority of the SL signal to be sent comprises one of: a channel access priority class (CAPC) of the SL signal to be sent, or a prose per-packet priority (PPPP) carried by the SL signal to be sent.

10. The method of claim 1, wherein the previous occasion and the transmission resource corresponding to the SL signal to be sent are in a same time slot, or the previous occasion is in a time slot before a time slot to which the transmission resource corresponding to the SL signal to be sent belongs.

11. The method of claim 1, wherein the transmission resource is determined in one of the following manners:

determining the transmission resource corresponding to the SL signal to be sent based on a scheduling of a second communication node;

autonomously selecting the transmission resource corresponding to the SL signal to be sent from a resource pool;

determining the transmission resource corresponding to the SL signal to be sent based on a configuration of the second communication node; or determining the transmission resource corresponding to the SL signal to be sent based on an associated SL signal.

12. A channel access method, applied to a second communication node, comprising:

configuring at least one transmission resource or at least one transmission resource pool of a sidelink (SL) signal corresponding to each SL signal type so that a first communication node performs channel access by using a first channel access type in a case where a sent SL signal satisfying a preset condition is detected at a previous occasion of a transmission resource corresponding to a SL signal to be sent and transmits the SL signal by using the at least one transmission resource or a transmission resource in the at least one transmission resource pool, wherein a sensing duration of a channel access procedure corresponding to the first channel access type is a fixed value;

wherein the sent SL signal satisfying the preset condition being detected comprises one of:

the transmission resource of the SL signal to be sent is within a remaining channel occupied time (COT) indicated by the detected and sent SL signal; or the transmission resource of the SL signal to be sent is within a remaining COT indicated by the detected and sent SL signal, and a priority of the SL signal to be sent is higher than or equal to a priority of the detected and sent SL signal;

wherein the first communication node is a user equipment (UE) that is allowed to use the remaining COT, and an UE identification corresponding to the SL signal to be sent is indicated by the sent SL signal; or the first communication node is a UE of a group of UEs that are allowed to use the remaining COT, and information of the group of UEs is indicated by the sent SL signal.

13. The method of claim 12, wherein configuration information of the at least one transmission resource or the at least one transmission resource pool comprises at least one of:

a resource position of the SL signal corresponding to the each SL signal type in the at least one resource pool and a channel access type corresponding to the each SL signal type;

a channel access priority level corresponding to the SL signal corresponding to the each SL signal type; or a mapping relationship between a channel access priority level (CAPC) of the SL signal and a prose per-packet priority (PPPP) of the SL signal.

14. The method of claim 13, wherein the SL signal type comprises one of a physical sidelink control channel (PSCCH), a physical sidelink shared channel (PSSCH), a physical sidelink feedback channel (PSFCH), a sidelink synchronization signal/physical broadcast channel block (S-SSB), a sidelink channel state information reference signal (SL CSI-RS), or a sidelink positioning reference signal (SL PRS); and the channel access type comprises one of a first channel access type or a second channel access type, wherein a sensing duration of a channel access procedure corresponding to the first channel access type is a fixed value, and a sensing duration of a channel access procedure corresponding to the second channel access type is a random value or a fixed value.

15. A channel access device, comprising a communication module, a memory, and at least one processor, wherein, the communication module is configured to perform a communication interaction between a first communication node and a second communication node; and the memory is configured to store at least one program;

wherein the at least one program, when executed by the at least one processor, causes the at least one processor to implement:

determining a transmission resource corresponding to a sidelink (SL) signal to be sent; and in a case where a sent SL signal satisfying a preset condition is detected at a previous occasion of the transmission resource, performing channel access by using a first channel access type, wherein a sensing duration of a channel access procedure corresponding to the first channel access type is a fixed value;

wherein the sent SL signal satisfying the preset condition being detected comprises one of: the transmission resource of the SL signal to be sent is within a remaining channel occupied time (COT) indicated by the detected and sent SL signal; or the transmission resource of the SL signal to be sent is within a remaining COT indicated by the detected and sent SL signal, and a priority of the SL signal to be sent is higher than or equal to a priority of the detected and sent SL signal;

wherein the first communication node is a UE that is allowed to use the remaining COT indicated by the detected and sent SL signal, and an UE identification corresponding to the SL signal to be sent is indicated by the sent SL signal; or the first communication node is a UE of a group of UEs that are allowed to use the remaining COT indicated by the detected and sent SL signal, and information of the group of UEs is indicated by the sent SL signal.

16. A non-transitory storage medium, storing a computer program, wherein the computer program, when executed by a processor, implements the channel access method of claim 1.

17. A non-transitory storage medium, storing a computer program, wherein the computer program, when executed by a processor, implements the channel access method of claim 12.

18. A non-transitory storage medium, storing a computer program, wherein the computer program, when executed by a processor, implements the channel access method of claim 2.

19. A non-transitory storage medium, storing a computer program, wherein the computer program, when executed by a processor, implements the channel access method of claim 3.

20. A non-transitory storage medium, storing a computer program, wherein the computer program, when executed by a processor, implements the channel access method of claim 4.

* * * * *